US009301892B2

(12) United States Patent
Daigle

(10) Patent No.: US 9,301,892 B2
(45) Date of Patent: Apr. 5, 2016

(54) LOW-GEAR SYSTEM FOR MANUALLY PROPELLED WHEELCHAIRS AND METHODS OF USE

(71) Applicant: Intelliwheels, Inc., Champaign, IL (US)

(72) Inventor: Scott C. Daigle, Westmont, IL (US)

(73) Assignee: IntelliWheels, Inc., Champaign, IL (US)

( * ) Notice: Subject to any disclaimer, the term of this patent is extended or adjusted under 35 U.S.C. 154(b) by 471 days.

(21) Appl. No.: 13/631,088

(22) Filed: Sep. 28, 2012

(65) Prior Publication Data

US 2013/0082512 A1    Apr. 4, 2013

Related U.S. Application Data

(60) Provisional application No. 61/540,768, filed on Sep. 29, 2011.

(51) Int. Cl.
*A61G 5/02*        (2006.01)
*F16H 57/08*       (2006.01)
*A61G 5/10*        (2006.01)

(52) U.S. Cl.
CPC ............... *A61G 5/026* (2013.01); *A61G 5/023* (2013.01); *F16H 57/082* (2013.01); *A61G 2005/1054* (2013.01); *A61G 2005/1083* (2013.01)

(58) Field of Classification Search
CPC ............................ F16H 57/082; A61G 5/026
USPC ............. 475/331; 301/280, 6.5, 124.2; 403/322.4; 380/250.1; 280/250.1
See application file for complete search history.

(56) References Cited

U.S. PATENT DOCUMENTS

| | | | | |
|---|---|---|---|---|
| 3,563,568 A * | 2/1971 | Sasse et al. | | 280/230 |
| 4,274,650 A * | 6/1981 | Gilles | | 280/250.1 |
| 5,362,081 A * | 11/1994 | Beidler et al. | | 280/250.1 |
| 5,482,305 A * | 1/1996 | Jeffries et al. | | 280/250.1 |
| 5,718,653 A * | 2/1998 | Showalter | | 475/230 |
| 5,743,544 A * | 4/1998 | Weaver | | 280/249 |
| 5,846,154 A * | 12/1998 | Godin | | 475/331 |
| 6,047,980 A * | 4/2000 | Margherita et al. | | 280/250.1 |
| 6,247,716 B1 * | 6/2001 | Sato et al. | | 280/250.1 |
| 6,346,061 B1 * | 2/2002 | Olsson | | 475/331 |
| 6,371,502 B1 * | 4/2002 | Howlett et al. | | 280/304.1 |
| 6,428,028 B1 * | 8/2002 | Folino et al. | | 280/249 |
| 6,755,430 B1 * | 6/2004 | Watwood et al. | | 280/250.1 |
| 6,805,371 B2 * | 10/2004 | Meginniss et al. | | 280/250.1 |
| 6,893,035 B2 * | 5/2005 | Watwood et al. | | 280/242.1 |
| 7,261,309 B2 * | 8/2007 | Watwood et al. | | 280/244 |

(Continued)

FOREIGN PATENT DOCUMENTS

| | | | | |
|---|---|---|---|---|
| CA | 2659266 | 2/2008 | | A61G 5/02 |
| EP | 0 836 843 | 4/1998 | | A61G 5/02 |
| EP | 000836843 A1 * | 4/1998 | | |
| GB | 2 291 01 | 1/1996 | | B62M 1/14 |
| JP | 10-014982 | 1/1998 | | A61G 5/02 |
| JP | 10-239184 | 9/1998 | | G01L 3/14 |
| JP | 2005-152314 | 6/2005 | | A61G 5/02 |
| WO | WO 93/02911 | 2/1993 | | A61G 5/02 |
| WO | WO 94/20323 | 9/1994 | | B60K 41/26 |
| WO | WO 98/37849 | 9/1998 | | A61G 5/02 |
| WO | WO 03/068125 | 8/2003 | | A61G 5/02 |

OTHER PUBLICATIONS

International Preliminary Report on Patentability issued in corresponding foreign application, pp. 1-8 (Apr. 10, 2014).
European Search Report issued in corresponding foreign application, pp: 1-6 (Apr. 22, 2015).

*Primary Examiner* — S. Joseph Morano
*Assistant Examiner* — Scott A Browne
(74) *Attorney, Agent, or Firm* — J. Peter Paredes; Rosenbaum IP, P.C.

(57) ABSTRACT

A low-gear drive system functionally coupled to a wheelchair is provided herein.

18 Claims, 10 Drawing Sheets

(56) References Cited

U.S. PATENT DOCUMENTS

| | | | |
|---|---|---|---|
| 7,387,588 B2 | 6/2008 | Bader | 475/303 |
| 7,641,210 B2 | 1/2010 | Babcock et al. | 280/250.1 |
| 7,959,176 B2 * | 6/2011 | Bidwell et al. | 280/250.1 |
| 8,419,581 B2 * | 4/2013 | Lo | 475/153 |
| 8,967,652 B2 * | 3/2015 | Penn | 280/250.1 |
| 2006/0197302 A1 | 9/2006 | Meginniss, III et al. | 280/250.1 |
| 2006/0208452 A1 * | 9/2006 | Mittelstaedt | 280/250.1 |
| 2008/0238022 A1 | 10/2008 | Kylstra et al. | 280/244 |
| 2009/0088284 A1 * | 4/2009 | Patterson | 475/213 |
| 2009/0273156 A1 * | 11/2009 | Byun | 280/250.1 |
| 2012/0231922 A1 * | 9/2012 | Byun | 475/312 |
| 2012/0302390 A1 * | 11/2012 | Lemire-Elmore et al. | 475/149 |

* cited by examiner

LOW-GEAR SYSTEM FOR MANUALLY PROPELLED WHEELCHAIRS AND METHODS OF USE

CROSS-REFERENCE TO RELATED APPLICATIONS

The present application claims priority from U.S. Provisional Patent Application Ser. No. 61/540,768, filed Sep. 29, 2011, which is hereby incorporated in its entirety.

BACKGROUND

The invention generally relates to medical devices. In particular, this invention relates to manually propelled wheelchairs.

There are an estimated 1.5 million manual wheelchair users (mWCUs) in the United States, and an estimated 200 million wheelchair users worldwide. Manual wheelchair users depend on their upper limbs for mobility and activities of daily living. However, up to 70% of manual wheelchair users report shoulder pain. Shoulder pain in mWCUs has been directly linked to further disability including difficulty performing activities of daily living, decreased physical activity, and reduced quality of life. Overall, any loss of upper limb function due to pain adversely impacts the independence and mobility of mWCUs. Thus, it is imperative to provide innovative technologies, therapies, and interventions to minimize shoulder pain.

Additionally, some wheelchair users may already have diminished strength in their upper limbs. The magnitude of diminishment can make use of a traditional manual wheelchair, with the torque necessary to move up hills in particular, unduly difficult and impracticable. Thus, there is a need for a manual wheelchair to accommodate wheelchair users with diminished strength of their upper limbs.

Using a powered wheelchair takes away all strain on the shoulders and reduces shoulder pain. However, powered chairs are not a viable option for most wheelchair users, because they are expensive, heavy (i.e., too heavy to load into a car, requiring special vans and lifts), have limited use duration due to battery life, require frequent recharging, provide little flexibility for persons who are capable of manually propelling their own chair, are sometimes too wide to fit through doorways, and contribute to reduced physical fitness due to limited upper body movement. Additionally, there is often a negative stigma attached to the use of these devices among manual wheelchair users. Most manual wheelchair users would never utilize a powered wheelchair unless it was their last option.

In order to address this large segment of the community that experiences difficulty pushing a wheelchair, various designs have been provided in the art. Examples include power assist wheelchairs, lever operated wheelchairs, and manually gear shifting wheelchairs. Push-rim activated power assist wheelchairs (PAPAWs) were one of the first technologies that addressed this need. They are similar to power wheelchairs, but batteries and motors in the wheel hubs assist the user to push his/her chair. These devices have been shown to significantly reduce the amount of energy used by an mWCU. However, PAPAWs are not ideal since they are heavy (e.g., 53 lbs of added weight) and more difficult to maneuver than a manual wheelchair, as they require two large electric motors and a battery. Also, the range of such devices is limited before the battery needs recharged. Further, these devices are quite expensive, e.g., more than an entry level powered chair, and the price does not include the cost of a wheelchair frame.

Lever operated wheelchairs are an innovative way to utilize a more ergonomic rowing motion from the wheelchair user. An example lever operated wheelchair is provided in an add-on device from Wijit Wheelchairs (Roseville, Calif.). Evaluation of these devices has shown that levers are a more comfortable method of propulsion, and they reduce the amount of work from the shoulders. However, these devices do not follow the concept of a traditional wheelchair design; that is, use of hand rims. Such wheelchairs accordingly require a relatively high learning curve to switch between forward and reverse propulsion. With an unintuitive method for current manual wheelchair users of braking and pushing in reverse, these devices have been very slow to catch on.

Magic Wheels (Seattle, Wash.) created a two-speed wheelchair add-on system in which the second gear is specifically catered for going uphill. In a clinical trial using this device, subjects experienced a significant reduction in the severity of shoulder pain. However, a limitation is that the user has to stop and manually shift into the other gear, e.g., physically turn a dial on the side of the wheel to shift. For many wheelchair users who have limited dexterity in their hands (e.g., due to spinal cord injury), it is physically impossible to turn this dial. Further, users have to be cognizant of when to shift, and thus individuals with cognitive deficits such as traumatic brain injury, dementia, etc., are unable to utilize such a device.

There is a need in the art for a suitable device that fits in between manual and powered wheelchairs.

SUMMARY OF THE INVENTION

Provided herein are methods, systems, and apparatuses for a low-gear drive system for a wheelchair. The low-gear drive system can comprise a sun gear, a ring gear, one or more planet gears, a planet carrier, an axle, and a mounting assembly for mounting the low-gear system to the frame of a wheelchair. The input of the low-gear drive system is coupled to a hand rim of the wheelchair, and the output is coupled to a wheel of the wheelchair. In a general embodiment, the input of the low-gear drive system may be coupled to any drive power source, such as a motor, a lever assembly, and/or the like. The planet carrier and the ring gear can be fixedly attached to either the hand rim or the wheel. In an alternative embodiment, the low-gear drive system can comprise two sun gears, a planet carrier, one or more pairs of planet gears, an axle, and a mounting assembly. In this embodiment, the second sun gear can be engaged with the wheel, and either the planet carrier or the first sun gear can be coupled to the hand rim.

In another embodiment, the low-gear drive system for a wheelchair may further comprise a quick-release mounting assembly for attaching the wheels and drive system to the wheelchair. The quick-release mounting assembly comprises a secondary axle, an axle plate, and a secondary axle aperture associated with a quick release assembly comprising a lever and a binder bolt. By engaging the lever and binder bolt, the secondary aperture frictionally engages the primary axle to attach the wheels and drive system to the wheelchair. In another embodiment, the quick-release mounting assembly comprises spring loaded ball bearings that protrude from the axle to prevent unintentional removal from the axle aperture.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE INVENTION

Figure 1:
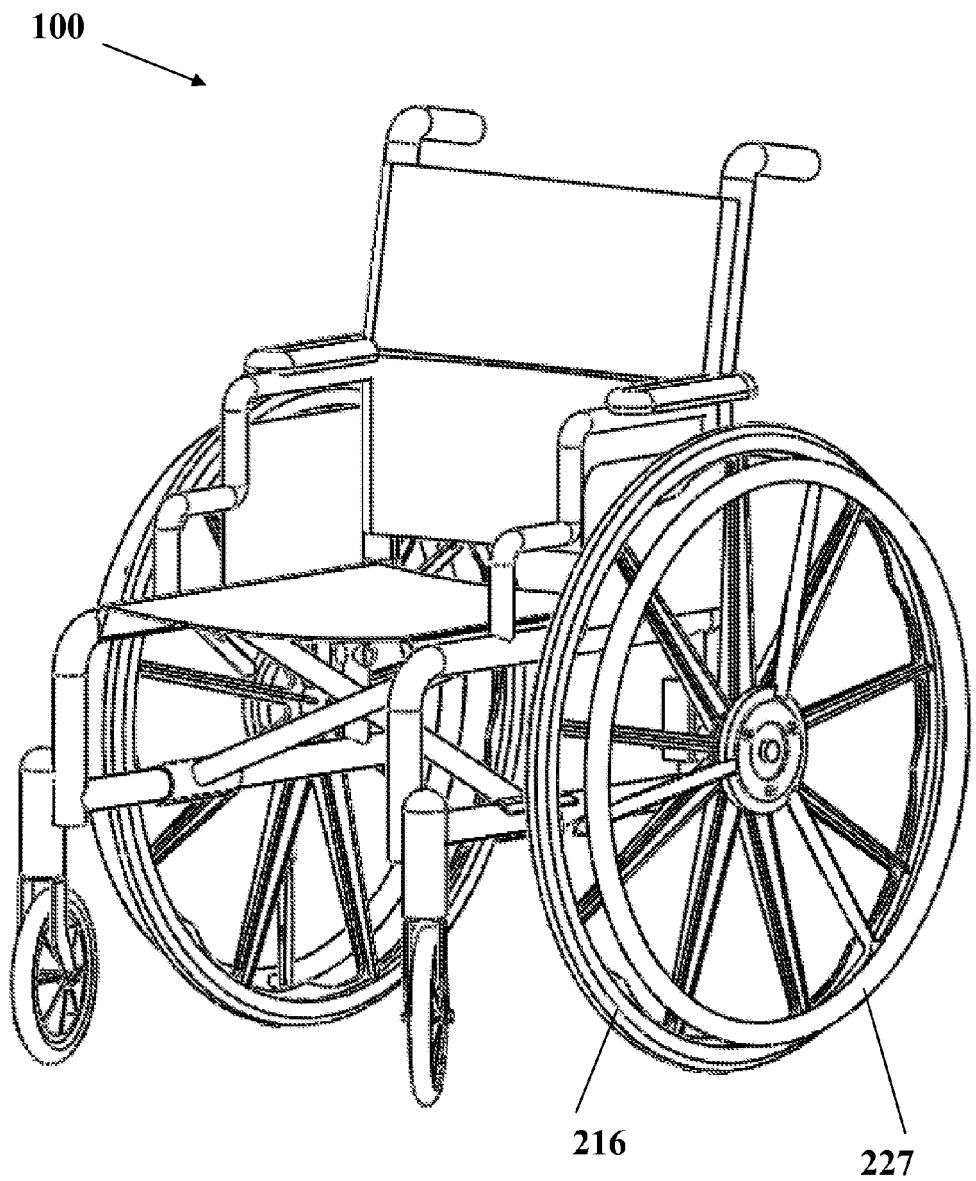
FIG. 1 is a perspective view of a wheelchair apparatus.

The foregoing and other features and advantages of the invention are apparent from the following detailed description of some embodiments, read in conjunction with the accompanying drawings. The detailed description and drawings are merely illustrative of the invention rather than limiting, the scope of the invention being defined by the appended claims and equivalents thereof.

Generally speaking, the embodiments disclosed herein provide a single low-gear system for manually propelled wheelchairs. As opposed to standard manual wheelchairs having the hand rim directly attached to the wheel, the embodiments disclosed herein provide a single low-gear system where the hand rim turns the input of the low-gear system and the wheel is turned by the output of the low-gear system. In some embodiments, the input of the low-gear system may be coupled to any drive power source, such as a motor, a lever assembly, the hand rim, and/or the like.

In operation of a preferred embodiment, the wheelchair user still pushes the hand rims forward, backward, and in opposite directions in order to turn; however, the hand rims drive the low-gear systems (located near the hub of each wheel), which in turn drive the wheels. This reduces the amount of force required from the wheelchair user, which has the potential to reduce the severity and incidence of shoulder pain for mWCUs.

In contrast to motor driven wheelchairs in the art, example systems of the preferred embodiments disclosed herein do not have a range that is limited by battery life. Further, an example system weighs less than 10 lbs additional to the wheelchair. In contrast to lever operated wheelchairs, the preferred embodiments disclosed herein retain the standard hand rim method of controlling the wheelchair. The system provides for the operator of a traditional arm-powered wheelchair to make use of the wheelchair with little or no injury to the shoulder of the operator by reducing the force required to move the wheelchair. The input of the system is coupled to the hand rim, and the output is coupled to the wheel. Through use and configuration of gear systems, including planetary gear systems, the rotational velocity of the hand rim relative to the wheel can be increased or decreased, as the design provides. The system can include a ring gear, one or more sun gears, a planet carrier, one or more planet gears, and a mounting assembly for mounting the system to the wheelchair. The ring gear, sun gears, and planet carrier can be either fixedly attached or rotatably coupled to the axle of the system or the wheel or hand rim of the wheelchair to achieve the desired rotational ratio between the hand rim and the wheel.

A detailed description of the embodiments disclosed herein is provided in the following pages. It will be appreciated that these pages provide detail regarding the embodiments disclosed herein, and the invention is not limited to these embodiments or details. While embodiments disclosed herein are shown and described, it should be understood that other modifications, substitutions, and alternatives are apparent to one of ordinary skill in the art. Such modifications, substitutions, and alternatives can be made without departing from the spirit and scope of the invention.

In one embodiment, the low-gear system is attached to the outside of each of the two wheels 216 of a wheelchair apparatus 100, as shown in FIG. 1. Alternatively, the low-gear system is attached to the inside of each of the two wheels 216 on the wheelchair 100. The output of the low-gear system is coupled to the wheel 216 and the input of the low-gear system is connected to the hand rims 227 as shown in FIG. 1. Alternatively, the input of the low-gear system may be connected to any manually powered device or apparatus coupled to the wheelchair, or any powered system if desired.

The embodiments disclosed herein include low-gear systems based on many different types of gear drive systems including, but not limited to, planetary gear sets, complex planetary gear sets, hypocycloidal gear sets, beveled gear sets, helical gear sets, traditional gear sets, and traditional gear sets in which multiple gears rotate on multiple axes of rotation.

Figure 2A:
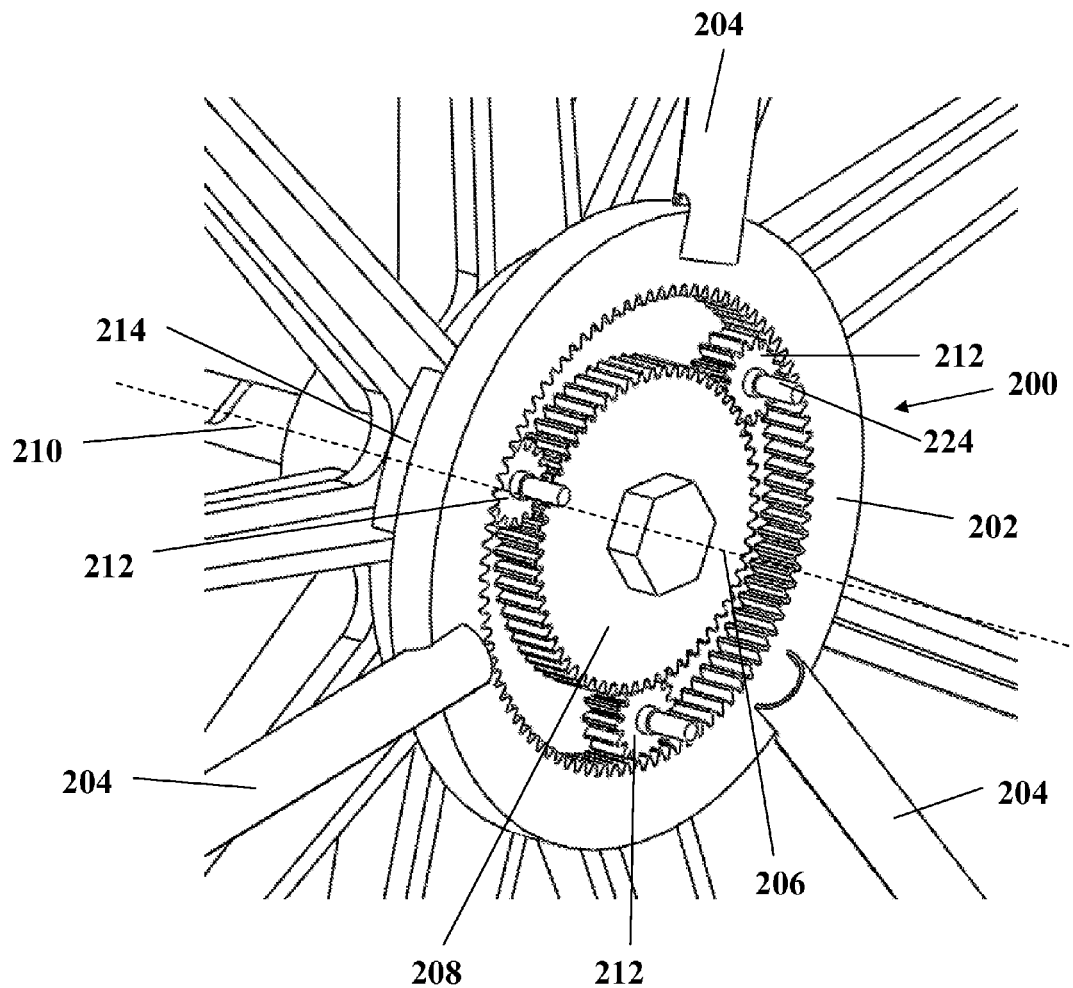
FIG. 2A is one embodiment of the low gear drive system attached to the outside of a wheelchair wheel, with a planet retainer plate omitted for clarity.
Figure 2B:
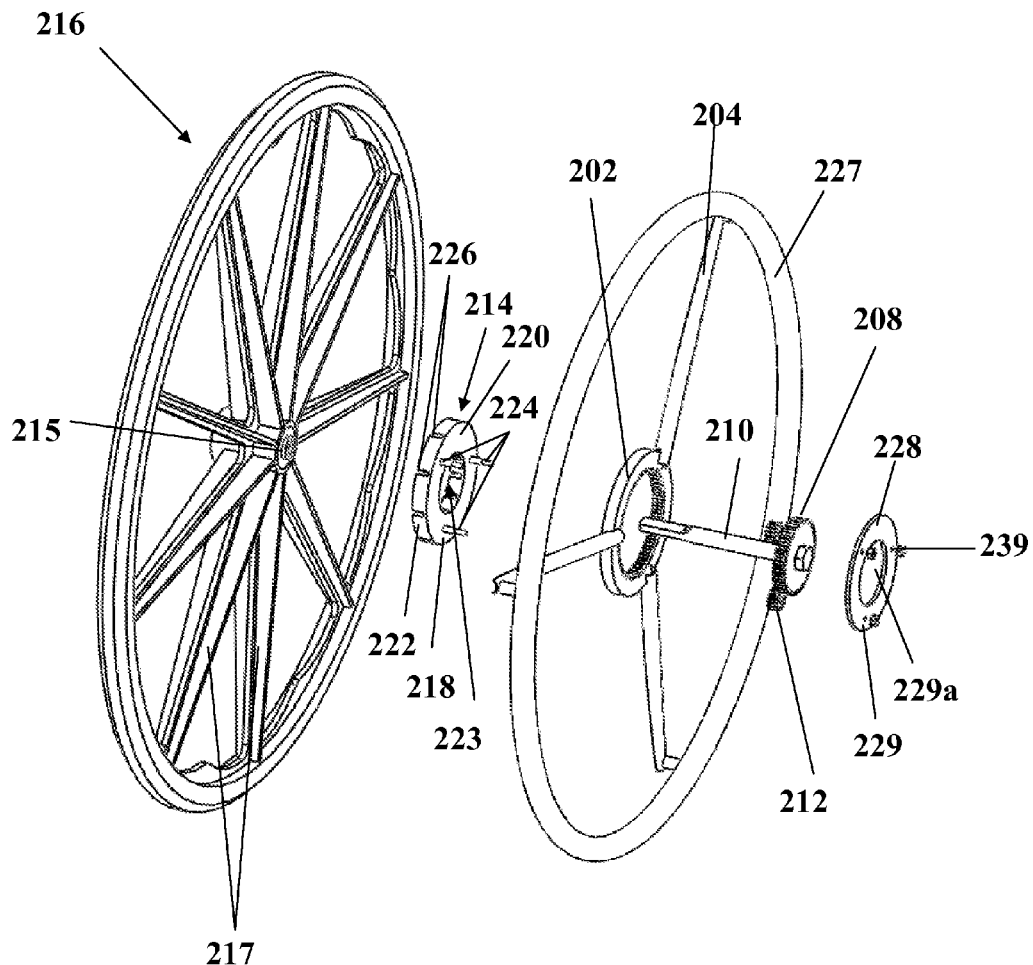
FIG. 2B is an exploded view of the embodiment of FIG. 2A.
Figure 3:
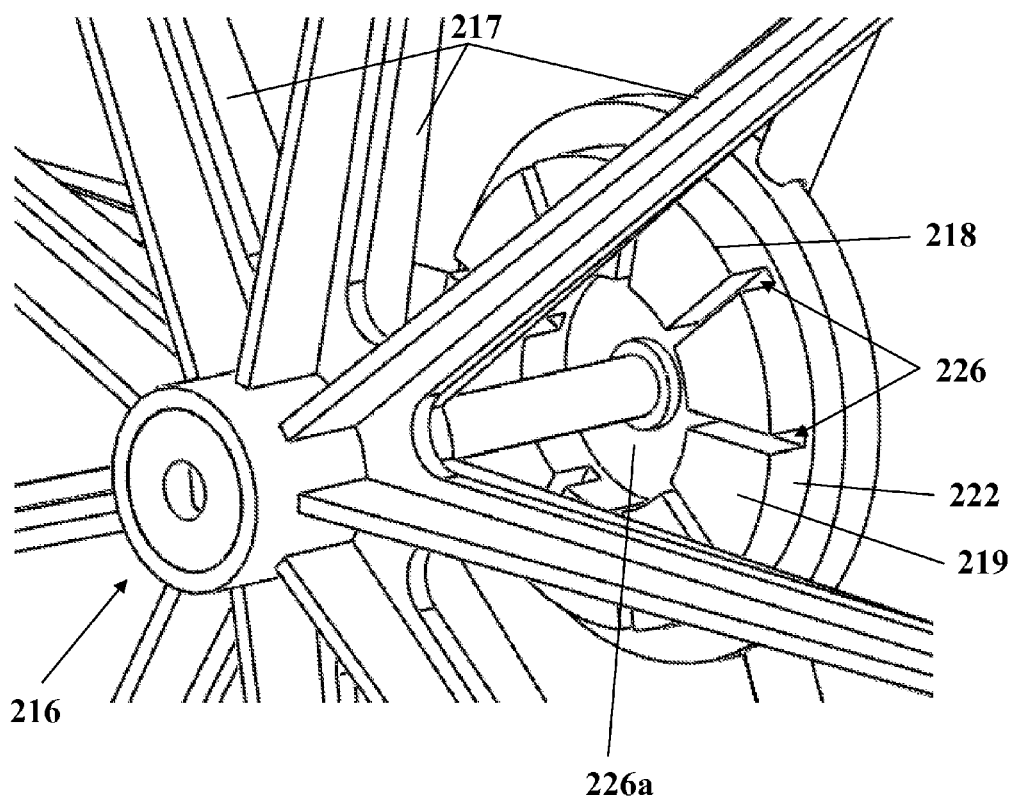
FIG. 3 is a perspective view of the embodiment of FIG. 2A depicting the planet carrier coupling to the wheel.

While all types of gearing systems are included in the embodiments disclosed herein, one preferred embodiment of a low-gear drive system is described in relation to FIGS. 2-4. FIG. 2A depicts an embodiment of the low-gear drive system, as shown coupled to a wheelchair in FIG. 1. The low-gear system 200 comprises a ring gear 202 fixedly attached to a hand rim 227 via a plurality of spokes 204. In one embodiment, the ring gear 202 is coaxially fixed to a center point or inner diameter of the hand rim 227. This embodiment does not limit the scope of the embodiments disclosed herein; any attachment method between the ring gear 202 and the hand rim 227 is included within the scope of the embodiments disclosed herein, such as a solid disk made from plastic, fiber glass, carbon fiber, or any other material. Preferably, the ring gear 202 is coaxially disposed within hand rim 227, and any force from the hand rim 227 is transmitted to the ring gear 202. In one embodiment, the ring gear 202 is coaxially attached to an inner diameter of the hand rim 227 by spokes 204. In one embodiment, the inner diameter of the hand rim 227 is between about 15 inches and 29 inches; alternatively, between about 19 and 25 inches; or alternatively, between about 20 and 23 inches. In one embodiment, the outer diameter of the ring gear 202 is between about 3 and 8 inches; alternatively, between about 4.0 and 6.0 inches; or alternatively, between about 4.5 and 5.0 inches. Thus, a ratio of the inner diameter of the hand rim 227 to the outer diameter of the ring gear 202 is at least between 2 and 10; alternatively, between at least 3.5 and 5.5; or alternatively, between at least 4.0 and 5.0. The ring gear 202 can define an axis of rotation 206 of the low-gear system 200. The low-gear system 200 can further comprise a sun gear 208. The sun gear 208 can define an axis of rotation that can be collinear to the axis of rotation 206 of the ring gear 202, when the sun gear 208 is coaxially disposed within the ring gear 202. The sun gear 208 can be fixedly attached to an axle 210, which coaxially extends from the inner surface of the sun gear 208.

The low-gear system 200 further comprises at least one planet gear 212 and a planet carrier 214. The planet gears 212 can constantly mesh with both the sun gear 208 and the ring gear 202. In the present embodiment, the low-gear system 200 comprises three planet gears 212; three or more planet gears 212 will maintain the collinearity of the axes of rotation of the ring gear 202 and the sun gear 208.

FIG. 2B depicts an exploded view of the embodiment of FIG. 2A. In the present embodiment, the planet carrier 214 is comprised of a body member 218 having a first surface 219 (as shown in FIG. 3), a second surface 220 opposite the first surface 219, and a wall thickness 222 therebetween. Furthermore, the body member 218 can be configured to define a void 223 through which the axle 210 can pass through. The void 223 may be of any shape and size, so long as it is sufficient to permit the axle 210 to pass therethrough. The planet carrier 214 has a diameter that is greater than the diameter of the sun gear 208, but is smaller than the diameter of the ring gear 202.

The planet carrier 214 further comprises one or more planet posts 224 projecting from the second surface 220 of the body member 218. Preferably, the planet posts 224 are integral with the body member 218. As shown in FIG. 2A, the planet gears 212 are rotatably coupled to the planet posts 224.

The planet carrier 214 can then be fixedly attached to the wheel 216. The method of attachment depends upon the structure of the wheel. The wheel 216 as depicted in FIG. 3 has a plurality of spokes 217, so one option is to form one or more slots 226 on the first surface 219 and into the wall thickness 222 of the body member 218, with each slot 226 adapted to receive and engage with one of the spokes 217. The slots 226 are disposed within the thickness of the first surface 219 and project radially from a concentric cup 226a disposed on the first surface 219. The concentric cup 226a coaxially fits over a wheel hub 215 on the wheel 216 when the slots 226 are fixedly associated with the spokes 217 of the wheel 216. When each slot 226 engages with its associated spoke 217, the planet carrier 214 will engage with the wheel 216 such that the planet carrier 214 cannot rotate with respect to the wheel 216. Accordingly, when the slots 226 operably engage with the spokes 217 of the wheel 216, as the planet carrier 214 is rotated, the wheel 216 and spokes 217 will also rotate.

Other methods for securing the planet carrier 214 to the wheel 216 are within the scope of the embodiments disclosed herein. Other methods include threaded couplings, keyed shafts, welding, set screws, nuts and/or bolts, any shape in which the two can engage with each other, and combining the wheel 216 and the planet carrier 214 as one integral part. These and any other method of securing the planet carrier 214 to the wheel 216 are included in the scope of the embodiments disclosed herein.

The low-gear system 200 can further comprise a planet retainer plate 228, as shown in FIG. 2B. The planet retainer plate 228 includes a plurality of holes 229 operably coupled to the planet posts 224, such that the planet gears 212 are positioned intermediate the second surface 220 of the body member 218 and the planet retainer plate 228, thereby preventing movement of the planet gears 212 along the length of the planet posts 224. The planet retainer plate 228 can be secured to the planet posts 224 by any suitable method, such as with nuts 239, rivets, or welding. Preferably, the planet retainer plate 228 includes a central opening 229a that fits over the sun gear 208.

Figure 4A:
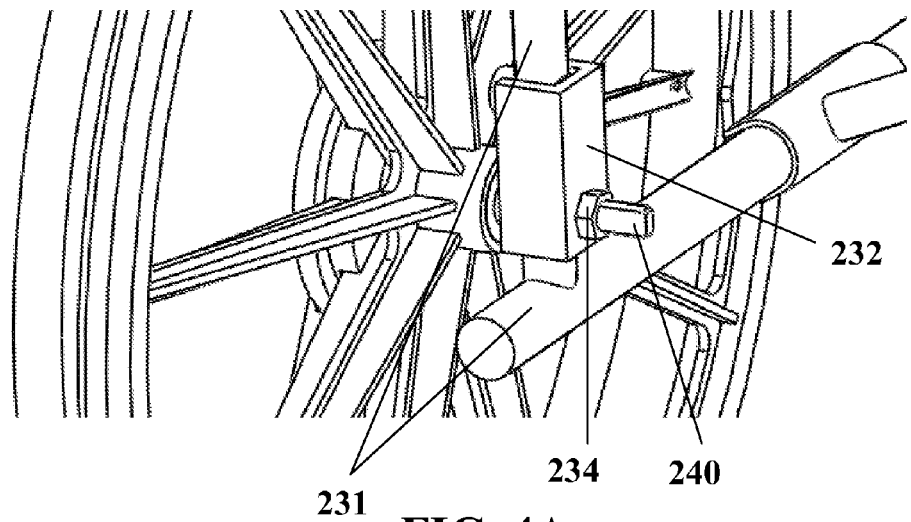
FIG. 4A is an assembled view of the mounting assembly.
Figure 4B:
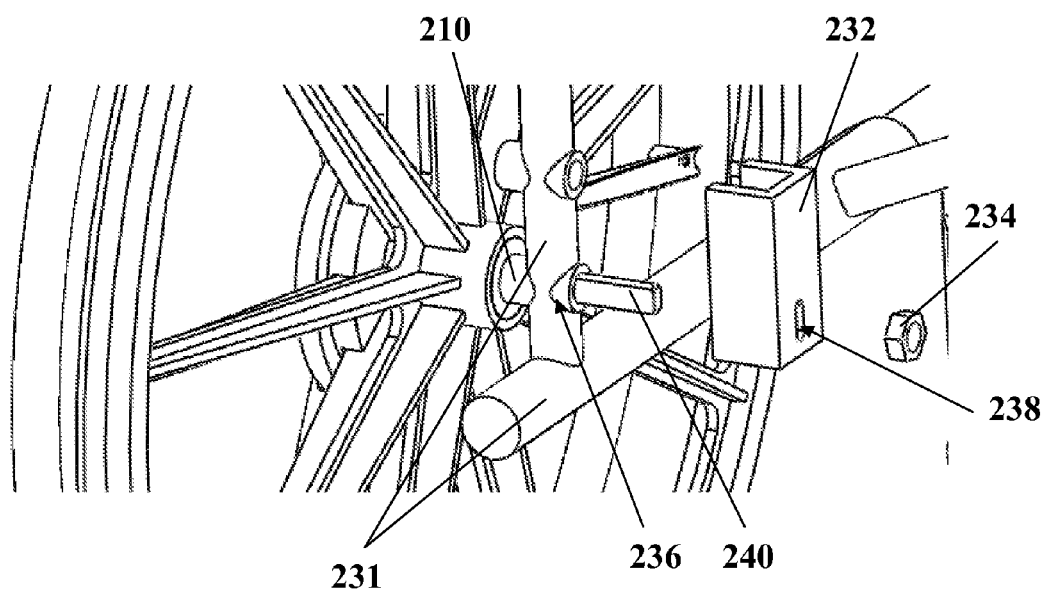
FIG. 4B is an exploded view of the mounting assembly of FIG. 4A.
Figure 4C:
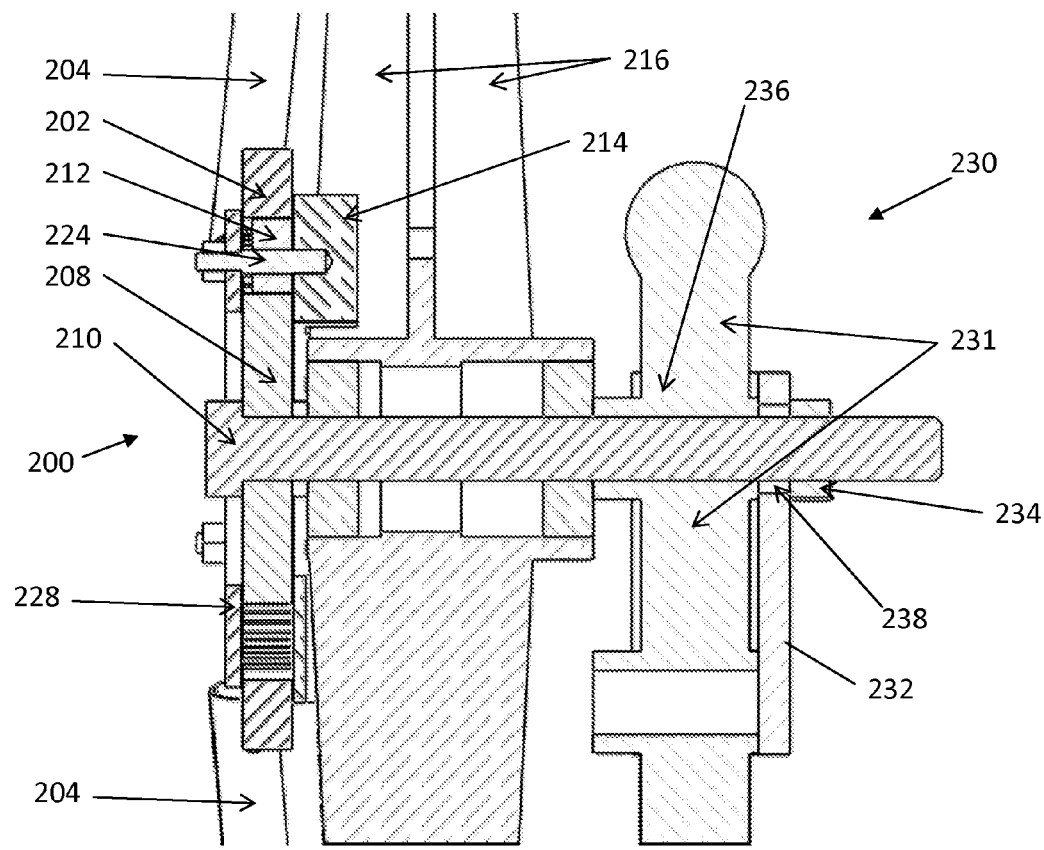
FIG. 4C is a cutaway view of the standard embodiment of the low gear drive system and the mounting assembly installed on a wheelchair.

A view of the embodiment illustrated in FIGS. 2A, 2B, and 3 is shown coupled to the wheelchair body frame in FIGS. 4A-4C. The low-gear system 200 can further comprise a mounting assembly 230 to attach the low-gear system 200 to the frame 231 of the wheelchair. In the present embodiment, the mounting assembly 230 comprises a bracket 232 and a nut 234. To attach the low-gear system 200 to the frame 231, axle 210 can coaxially extend through a first axle aperture 236 in the frame 231, protruding on the opposite side of the first axle aperture 236. The bracket 232 can be configured to have a second axle aperture 238 through which axle 210 can coaxially extend. In order to prevent axle 210 from rotating, the axle 210 can include one or more ground flats 240. In the present embodiment, the second axle aperture 238 is configured to accommodate an axle with two ground flats, which, when passed therethrough, prevents rotation of the axle. The bracket 232 can further be configured to engage with the frame 231 of the wheelchair, as shown in FIGS. 4A-4C. Finally, the bracket 232 is secured to the frame by attaching a nut 234 to the ground flats 240 of the axle 210.

Figure 5A:
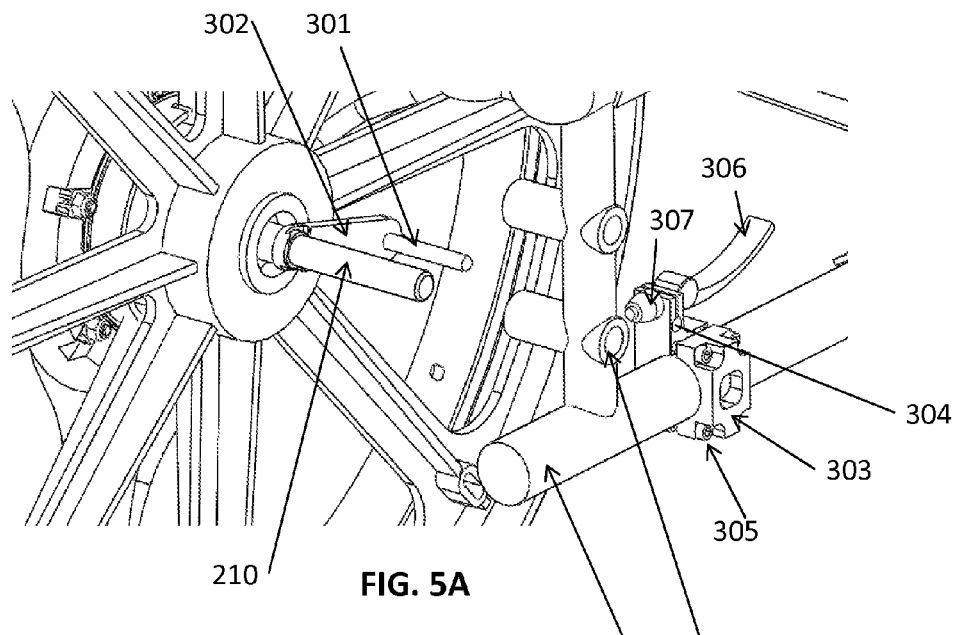
FIG. 5A is a disassembled view of an embodiment of the invention further comprising a quick release mounting assembly.
Figure 5B:
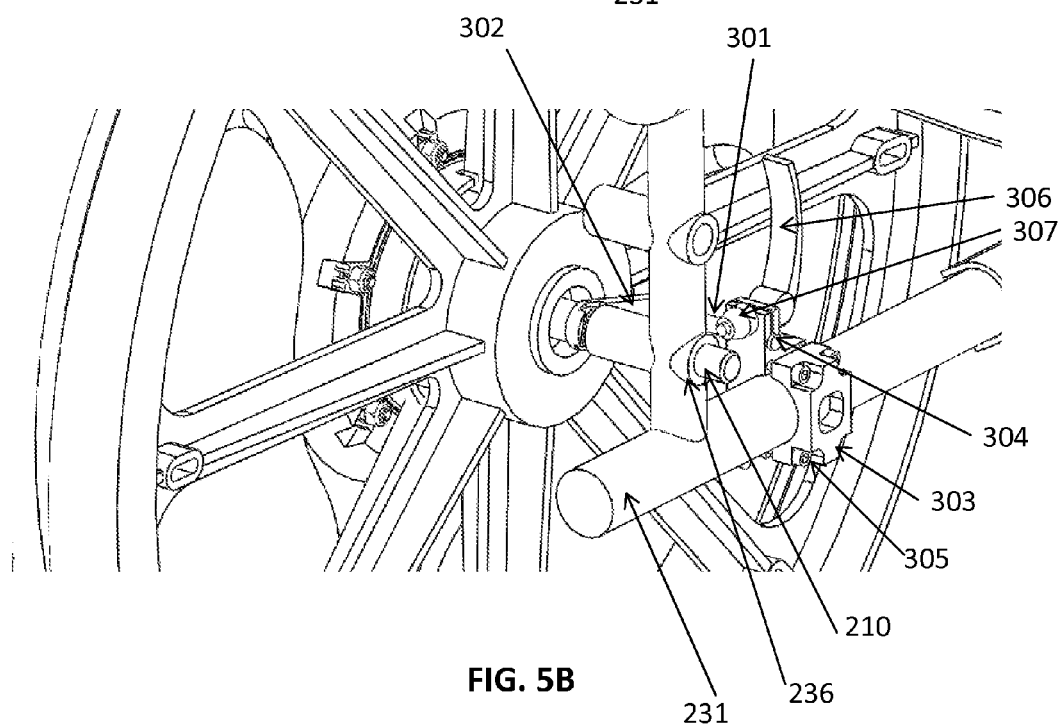
FIG. 5B is an assembled view of the embodiment of the invention further comprising a quick release mounting assembly of FIG. 5A.
Figure 5C:
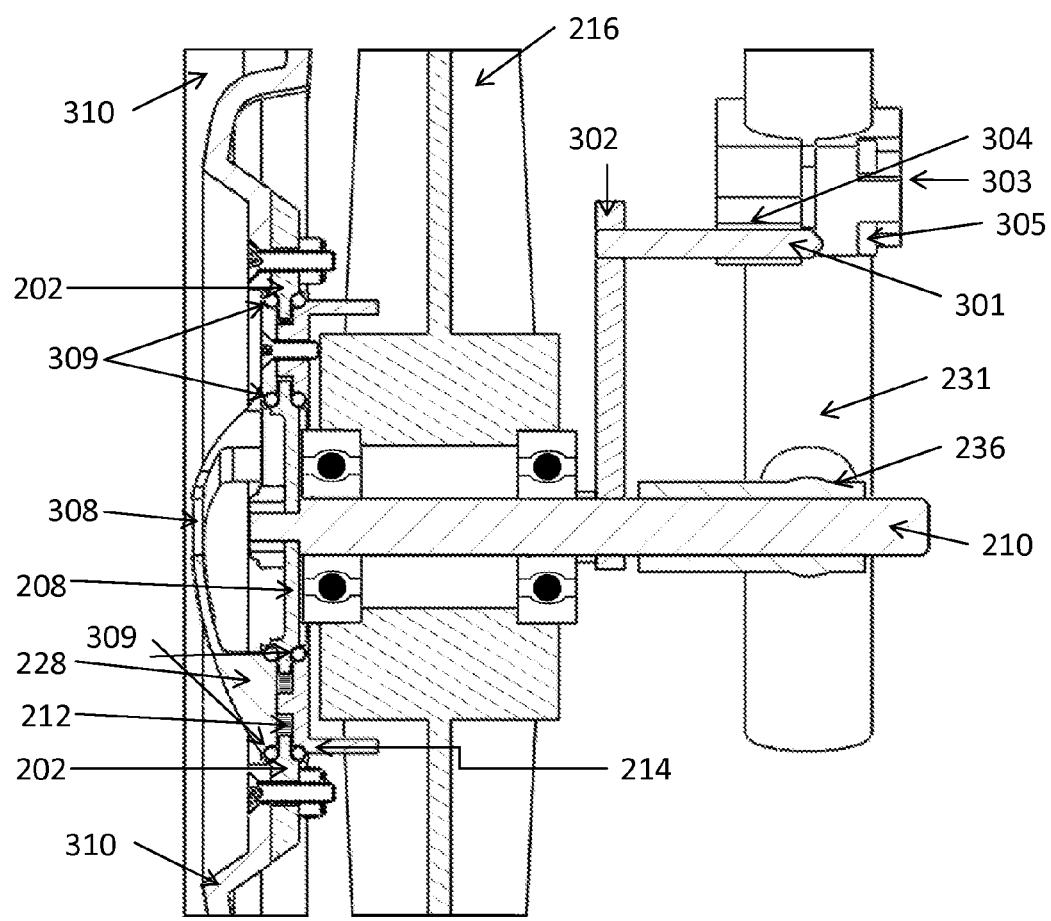
FIG. 5C is a cutaway view of an embodiment of the low gear drive system including ball bearings and quick release mounting assembly, installed on a wheelchair.

Other methods of preventing rotation of the axle 210 are within the scope of the embodiments disclosed herein, such as lock washers, a keyed shaft, shaft collars, welding the axle directly to the frame, or any other method. One such example of a method for preventing the axle from rotating is depicted in FIGS. 5A-5C. In this example embodiment, the axle 210 is a primary axle, and the primary axle 210 fits into the primary axle aperture 236 of the frame 231. This embodiment of the primary axle 210 has no ground flats, but it is fixedly attached to a secondary axle 301 with an axle plate 302 by welding, gluing, set screws, threaded couplings, keyed shafts or any other secure way of mounting such that the primary axle 210 cannot rotate in the axle plate 302. The secondary axle 301 then fits into a secondary axle aperture 304 of a quick release mounting assembly 303. In this embodiment, the quick release assembly 303 is attached to the frame 231 with four bolts 305. In alternative embodiments, the quick release assembly 303 may be attached to the frame 231 by welding, or the quick release assembly 303 may be integral with the frame 231. By inserting the secondary axle 301 into the secondary axle aperture 304, the primary axle 210 is prevented from rotating.

In this particular embodiment, the quick release assembly 303 also serves to allow the wheels 216 to be quickly attached or detached from the frame 231. By flipping the lever 306 of the binder bolt 307 to a down position as shown in FIG. 5A, the secondary axle aperture 304 widens allowing the secondary axle 301 to slide freely in or out. By flipping the lever 306 of the binder bolt 307 up as shown in FIG. 5B, the secondary axle aperture 304 contracts, which keeps the secondary axle 301 from sliding by friction, effectively rotatably attaching the entire wheel assembly to the frame 231 but fixably attaching the axles 210 and 301 to the frame 231. In this embodiment, the binder bolt 307 is mounted on the secondary axle aperture 304, but it could also be mounted on the primary axle aperture 236. Alternatively, the primary axle 210 could feature spring loaded ball bearings which protrude from the axle 210 to prevent it from sliding in and out of the primary axle aperture 236.

In order to provide easy handling, the planet retainer plate 228 can be shaped in a way that allows it to be grasped with a single hand. The planet retainer plate 228 therefore features a handle 308, as shown in FIG. 5C.

In order to decrease wear on the gear teeth, decrease gear noise, and increase the smoothness of operation, ball bearing tracks 309 can be formed into the sun gear 208, the planet retainer plate 228, the planet carrier 214, and the ring gear 202, as shown in FIG. 5C. The ball bearing tracks 309 allow ball bearings to roll in concentric circles about the primary axle 210, thus allowing smooth operation. Alternately, one could do without ball bearings and use a track made of a wear resistant material such as, but not limited to, nylon or acetal. In another embodiment, also shown in FIG. 5C, the plurality of spokes 204 may be replaced by a formed disk 310 which connects the ring gear 202 to the hand rim 227. The formed disk 310 has an additional benefit in that it prevents fingers from getting caught in the spokes. The formed disk 310 may be a solid disk made from plastic, fiber glass, carbon fiber, or any other material.

In operation, a user rotates the hand rim 227. The power imparted by the rotation will be transmitted through the plurality of spokes 204 or the formed disk 310 to the ring gear 202, causing the ring gear 202 to rotate. The rotation of the ring gear 202 will cause the planet gears 212 to rotate by the meshing engagement therebetween. Owing to the sun gear 208 being fixedly attached to the axle 210, the planet gears 212 will also rotate with respect to the axis of rotation 206. The rotation of the planet gears 212 about the axis of rotation 206 will rotate the planet carrier 214 as well as the wheel 216 to which the planet carrier 214 is engaged. By adjusting the sizes of the ring gear 202, the sun gear 208, the planet gears 212, and the planet carrier 214, the low-gear system will enable the hand rim 227 to rotate at a different angular velocity than the wheel 216. The low-gear system 200 can be configured to allow the hand rim 227 to rotate at an angular velocity greater or less than that of the wheel 216, whichever is desired for a given application.

With the embodiment previously described, the gear ratios that are possible include any ratio greater than 1:1 but less than 2:1. The ratio is changed by altering the size of the planet gears with respect to the size of the sun gear. As the size of the planet gear decreases, the gear ratio increases. If the ring gear is connected to the wheel and the planet carrier is attached to the hand rim, a high gear system is achieved where the gear ratios are exactly reversed. In this variation of the above embodiments, the gear ratios that are possible include any gear ratio greater than 1:2 but less than 1:1.

Figure 6:
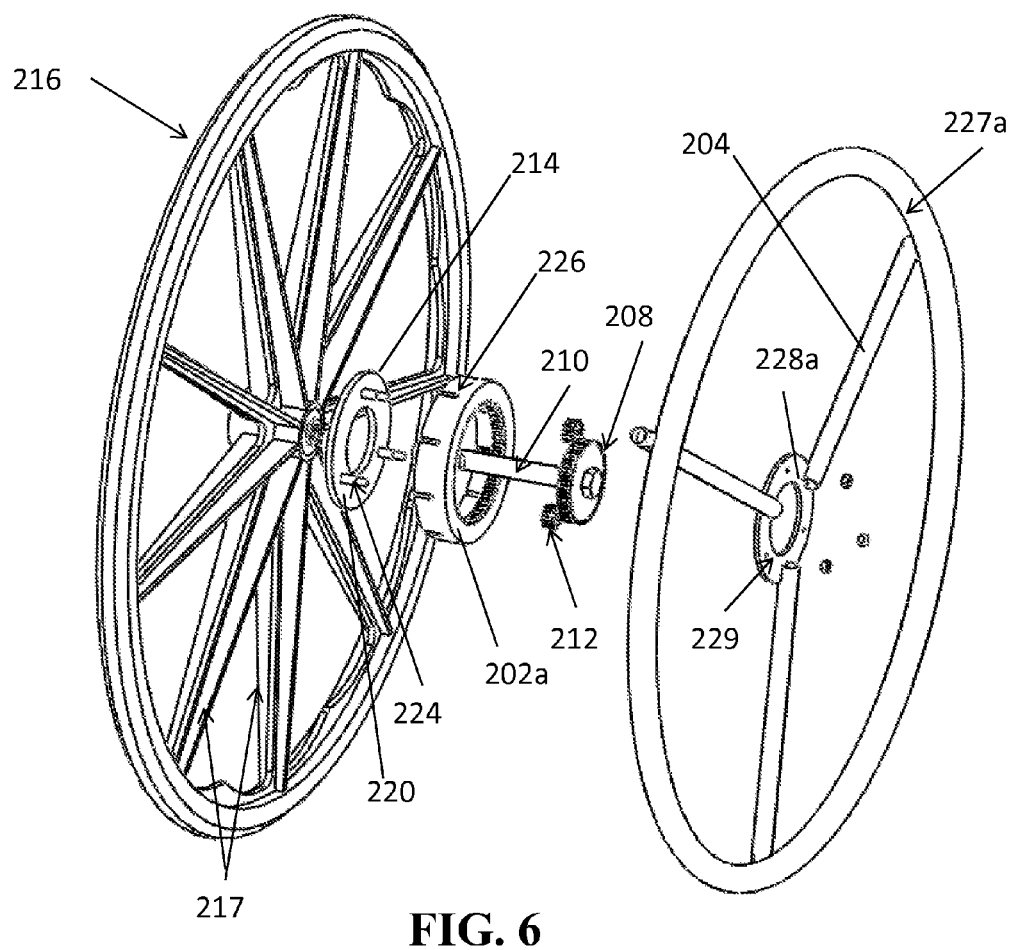
FIG. 6 is an exploded perspective view of one embodiment of the low gear drive system.

In an alternative embodiment, the planet carrier 214 is fixedly attached to the hand rim 227 and the ring gear 202 is fixedly attached to the wheel 216, as shown in FIG. 6. The planet carrier 214 may be attached to the hand rim 227 by any method of attachment to the hand rim 227 described hereinabove. In one embodiment, the planet retainer plate 228 is coaxially fixed to the hand rim 227 by way of a plurality of spokes 204, and in another embodiment it is attached with a formed disk 310. As indicated above, the plate retainer plate 228 may be coaxially fixed to a center point or inner diameter of the hand rim 227. The planet retainer plate 228 includes the plurality of holes 229 through which the planet posts 224 coaxially fit, thereby fixedly attaching the planet carrier 214 to the hand rim 227. Similarly, the ring gear 202 may be fixedly attached to the wheel 216 by any method of attachment to the wheel 216 described hereinabove. In one embodiment, the ring gear 202 includes one or more slots 226 on the first surface 219 that are disposed within a wall thickness of the ring gear 202, with each slot 226 adapted to receive and engage with one of the spokes 217 of the wheel 216. In a similar fashion, the sun gear 208 is coaxially disposed within the ring gear 202 and rotatably associated with the at least one planet gear 212. The at least one planet gear 212 is rotatably associated with the planet posts 224 and the ring gear 202 as to transmit rotation of the hand rim 227 and planet retainer plate 228 to the ring gear 202 and the wheel 216. The sun gear 208 can be fixedly attached to an axle 210, which coaxially extends from the inner surface of the sun gear 208. In some embodiments, the relative positions of the ring gear 202 and the planet carrier 214 may be reversed to permit the attachment of the ring gear 202 to the wheel 216, if the method of attachment so requires.

Figure 7A:
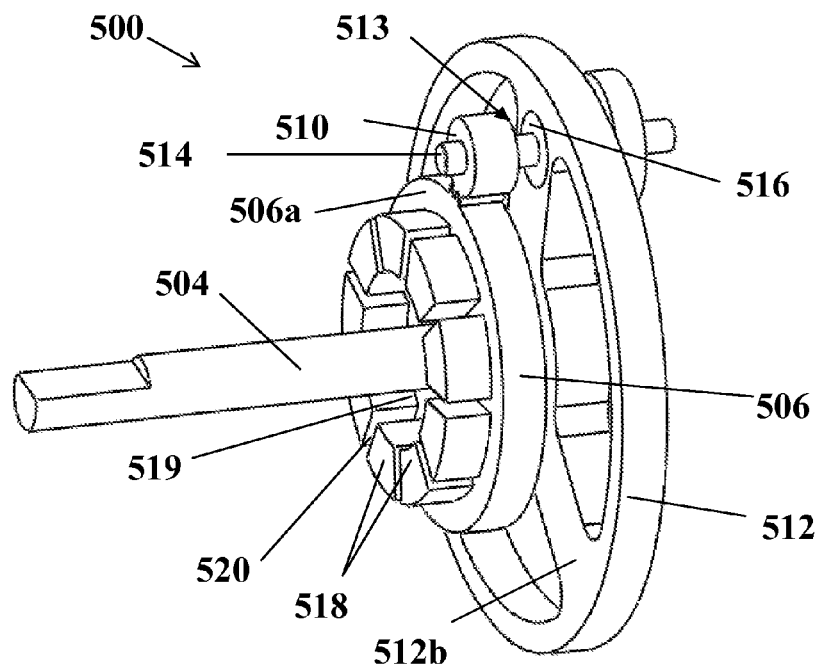
FIG. 7A is a perspective view of another embodiment of the low gear drive system.
Figure 7B:
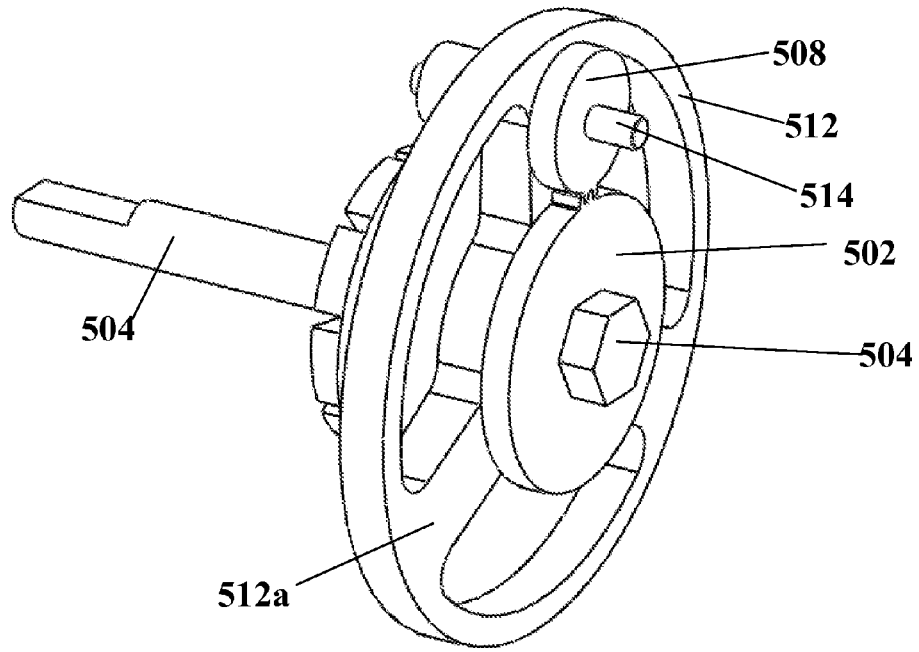
FIG. 7B is an alternative perspective view of the embodiment of the low gear drive system depicted in FIG. 7A.

A further embodiment of the invention disclosed herein is depicted in FIGS. 7A-B. Here, the low-gear system 500 comprises a first sun gear 502 fixedly attached to an axle 504 and a second sun gear 506 fixedly associated to the axle 504. The low-gear system 500 further comprises a first planet gear 508 and a second planet gear 510, wherein the first and second planet gears 508, 510 are rotatably coupled to a planet carrier 512. The first planet gear 508 can be functionally coupled to the second planet gear 510 such that rotation of one causes a corresponding rotation of the other. Furthermore, the first planet gear 508 can be meshed with the first sun gear 502 and the second planet gear 510 can be meshed with the second sun gear 506.

The planet carrier 512 includes a first surface 512a and a second surface 512b, whereby the first sun gear 502 is rotatably associated with the first surface 512a and the second sun gear 506 is rotatably associated with the second surface 506. The first planet gear 508 is rotatably coupled to the first surface 512a of the planet carrier 512 and the second planet gear 510 can be rotatably coupled to the second surface 512b of the planet carrier 512. In the present embodiment, the first planet gear 508 and the second planet gear 510 are coupled via a planet attachment assembly 513 comprising a planet post 514 and a ball bearing 516. The first planet gear 508 and the second planet gear 510 can be rotatably attached to the planet post 514 by any suitable method, including welding, keys, ground flats, set screws, and any other method known in the art. In order to accommodate the ball bearing 516, the planet carrier 512 can include an aperture configured to allow the ball bearing 516 to be disposed therein. The ball bearing 516 can be fixedly attached to the planet carrier 512 by any suitable method, such as by welding or press fit. The planet post 514 can then be attached to the ball bearing 516 such that the planet post 514, and by extension the first planet gear 508 and the second planet gear 510, can rotate with respect to the planet carrier 512.

The second sun gear 506 can be fixedly attached to the wheel by any method of attachment described hereinabove for attachment to the wheel 216. For example, second sun gear 506 can comprise a plurality of protrusions 518 projecting from a surface 506a of the second sun gear 506. The plurality of protrusions 518 can radially extend around a central cup 519 and the protrusions 518 can be configured to form a plurality of slots 520 intermediate each of the protrusions 518. Similar to the method of attachment of the planet carrier 214 to the wheel 216 above, the plurality of slots 520 can be configured to be associated and fixedly engage with the spokes 217 of the wheel 216 (not pictured) so as to prevent the second sun gear 506 from rotating with respect to the wheel 216. Accordingly, rotation of the second sun gear 506 cases rotation of the spokes 217 of the wheel 216. Similarly, the planet carrier 512 can be fixedly attached to the spokes 204 of the hand rim 227 by any method described hereinabove for attachment to the wheel 216. Alternatively, the planet carrier 512 is coaxially fixed within an inner diameter of the hand rim 227 by means of a formed disk 310 or a plurality of spokes 204.

In an alternative embodiment, the planet carrier 512 can be fixedly attached to the wheel 216, while the first sun gear 502 and the second sun gear 506 can be fixedly attached to the hand rim 227. The first sun gear 502 and second sun gear 506 can be fixedly attached to the hand rim 227 by any of the methods described hereinabove, and the planet carrier 512 can be attached to the wheel 216 by any of the methods described hereinabove.

In further alternative embodiments, the planet carrier 512, the first sun gear 502, the second sun gear 506, and the pairs of first and second planet gears 508, 510 can be positioned in any order along the length of the axle 210. This includes configurations in which the first sun gear 502, the second sun gear, 506, and the pairs of first and second planet gears 508, 510 are on one side of the planet carrier 512.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A low-drive gear wheel apparatus adaptable to a wheelchair comprising:
    a wheel; a hub; a plurality of spokes that radially extend from the hub to the wheel;
    a hand rim associated with the wheel; and
    a planetary gearing system associated with the wheel;
    wherein the planetary gearing system comprises an axle adapted to be fixedly attached to a body frame of a wheel based system, an output of the planetary gearing system is coupled to the wheel, an input of the planetary gearing system is coupled to the hand rim; a sun gear; a ring gear; a planet carrier having a body member with an axially inner first surface, an axially outer second surface, a wall thickness between the first and second surface, and a plurality of radially projecting slots extending from a radially inner surface of the planet carrier to a radially outer surface of the planet carrier and further extending from the first surface into the wall thickness of the body member wherein the spokes are received in each slot; and at least one planet gear rotatable coupled to said planet carrier and in constant mesh with the sun gear and the ring gear wherein the sun gear is fixedly attached to the axle of the planet gearing system.

2. The low-drive gear wheel apparatus of claim 1, further comprising a ball bearing track formed in at least one of the sun gear, the ring gear, and the planet carrier; wherein the ball bearing track serves to maintain in-line rotation and the ball bearing track has ball bearings disposed therein.

3. The low-drive gear wheel apparatus of claim 1, wherein the ring gear of the planetary gearing system is fixedly attached to the associated hand rim by one of the fixation methods selected from the group consisting of spokes and a large disk.

4. The low-drive gear wheel apparatus of claim 1, wherein the plurality of spokes are reversibly coupled with the plurality of radially extending slots; and
    one or more planet posts projecting from the second surface of the body member.

5. The low-drive gear wheel apparatus of claim 1, wherein the planetary gearing system further comprises a planet retainer plate fixedly attached to the planet carrier by the planet posts.

6. The low-drive gear wheel apparatus of claim 1, wherein the apparatus further comprises a quick-release mounting mechanism for attaching the low-drive gear wheel apparatus to a quick-release attachment point on a body frame of a wheel based system.

7. The low-drive gear wheel apparatus of claim 6, wherein the quick-release mounting mechanism comprises:
    a. a secondary axle; and
    b. an axle plate;
    c. wherein the quick release attachment point comprises
        i. an action assembly comprising a lever and a binder bolt, the lever and the binder bolt operably coupled to one another;
        ii. a clamp with a secondary axle aperture adapted to receive the secondary axle; and the secondary axle is fixedly coupled to the axle plate; the axle plate and secondary axle are fixedly coupled to the axle of the low-gear drive system; the action assembly is operably coupled to the secondary axle aperture so as to tighten the clamp about the secondary axle when inserted into the secondary axle aperture, thereby fixedly coupling the secondary axle within the clamp by a compressive frictional force.

8. The apparatus of claim 7, further comprising a planet retainer plate fixedly attached to the planet carrier by a plurality of planet posts.

9. The low-drive gear wheel apparatus of claim 1, wherein the axle of the planetary gearing system is adapted to be fixedly attached to a body frame of a wheel based system by a mounting assembly comprising a bracket, wherein the bracket is configured to non-rotatably couple to the body frame of the wheel based system and the axle comprises one of the attachment configurations selected from the group consisting of threaded couplings, ground flats, set screws, and keys.

10. A low-drive gear wheel apparatus adaptable to a wheelchair comprising:
    a wheel; a hub; a plurality of spokes that radially extend from the hub to the wheel;
    a hand rim associated with the wheel; and
    a planetary gearing system associated with the wheel;
    an axle adapted to be fixedly attached to a body frame of a wheel based system;
    an output coupled to the wheel;
    an input of the coupled to the hand rim;
    a sun gear;
    a ring gear having a body member with an axially inner first surface, an axially outer second surface, a wall thickness between the first and second surface, and a plurality of radially projecting slots extending from a radially inner surface of the ring gear to a radially outer surface of the ring gear and further extending from the first surface into the wall thickness of the body member wherein the spokes are received in each slot;

a planet carrier having an outer surface with one or more planet posts projecting toward the hand rim disposed thereon; and at least one planet gear rotatably coupled to said planet carrier and in constant mesh with the sun gear and the ring gear wherein the sun gear is fixedly attached to the axle of the planet gearing system.

11. The low-drive gear wheel apparatus of claim 10, further comprising a ball bearing track formed in at least one of the sun gear, the ring gear, and the planet carrier; wherein the ball bearing track serves to maintain in-line rotation and the ball bearing track has ball bearings disposed therein.

12. The low-drive gear wheel apparatus of claim 10, wherein the ring gear is fixedly attached to the wheel.

13. The low-drive gear wheel apparatus of claim 10, wherein the plurality of spokes are reversibly coupled with the plurality of radially extending slots.

14. The low-drive gear wheel apparatus of claim 10, further comprising a planet retainer plate fixedly attached to the planet carrier by the planet posts.

15. The low-drive gear wheel apparatus of claim 10, wherein the apparatus further comprises a quick-release mounting mechanism for attaching the low-drive gear wheel apparatus to a quick-release attachment point on a body frame of a wheel based system.

16. The low-drive gear wheel apparatus of claim 15, wherein the quick-release mounting mechanism comprises:
a. a secondary axle; and
b. an axle plate;
wherein the quick-release attachment point comprises:
   i. an action assembly comprising a lever and a binder bolt, the lever and the binder bolt operably coupled to one another;
   ii. a clamp with a secondary axle aperture adapted to receive the secondary axle; and the secondary axle is fixedly coupled to the axle plate; the axle plate and secondary axle are fixedly coupled to the axle of the low-gear drive system; the action assembly is operably coupled to the secondary axle aperture so as to tighten the clamp about the secondary axle when inserted into the secondary axle aperture, thereby fixedly coupling the secondary axle within the clamp by a compressive frictional force.

17. The low-drive gear wheel apparatus of claim 16, further comprising a planet retainer plate fixedly attached to the planet carrier by the planet posts.

18. The low-drive gear wheel apparatus of claim 10, wherein the axle is fixedly attached to a body frame of a wheel based system by a mounting assembly comprising a bracket, wherein the bracket is configured to non-rotatable couple to the body frame of the wheel based system and the axle comprises one of the attachment configurations selected from the group consisting of threaded couplings, ground flats, set screws, and keys.

\* \* \* \* \*